United States Patent
Smith et al.

(10) Patent No.: US 7,010,797 B2
(45) Date of Patent: Mar. 7, 2006

(54) SCALABLE, SPACE EFFICIENT, HIGH DENSITY AUTOMATED LIBRARY

(75) Inventors: Frank T. Smith, Nederland, CO (US); Charles Allen Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 927 days.

(21) Appl. No.: 09/740,194

(22) Filed: Dec. 18, 2000

(65) Prior Publication Data

US 2003/0210493 A1   Nov. 13, 2003

(51) Int. Cl.
*G11B 17/03* (2006.01)
(52) U.S. Cl. .................... 720/600; 360/98.06; 700/214
(58) Field of Classification Search ................. 360/92; 369/36, 34, 30.39; 414/281, 277, 280, 273, 414/331.14
See application file for complete search history.

(56) References Cited

U.S. PATENT DOCUMENTS

| | | | | |
|---|---|---|---|---|
| 3,664,523 A | * | 5/1972 | Hagel | 414/255 |
| 3,727,778 A | * | 4/1973 | Hollenbach | 414/541 |
| 3,938,190 A | * | 2/1976 | Semmlow et al. | 360/92 |
| 4,504,936 A | * | 3/1985 | Faber et al. | 369/34.01 |
| 5,174,707 A | * | 12/1992 | Suekane et al. | 414/269 |
| 5,416,914 A | * | 5/1995 | Korngiebel et al. | 711/114 |
| 5,595,263 A | * | 1/1997 | Pignataro | 186/53 |
| 5,940,356 A | * | 8/1999 | Toumbas | 369/30.39 |
| 6,222,699 B1 | * | 4/2001 | Luffel et al. | 360/92 |
| 6,262,863 B1 | * | 7/2001 | Ostwald et al. | 360/92 |
| 6,304,798 B1 | * | 10/2001 | Carpenter | 700/258 |
| 6,488,462 B1 | * | 12/2002 | Williams | 414/277 |
| 6,602,037 B1 | * | 8/2003 | Winkler | 414/273 |
| 6,621,655 B1 | * | 9/2003 | White et al. | 360/92 |

* cited by examiner

*Primary Examiner*—Angel Castro
(74) *Attorney, Agent, or Firm*—Yee & Associates, P.C.

(57) ABSTRACT

The present invention provides removable-unit storage modules, which can be combined into a network. The storage modules comprise storage cells arranged in a rule based structured configuration, and robotic hands to which move along tracks in order to retrieve objects from the storage cells. In one embodiment, the storage cells are used to contain data storage units. Several modules can be combined into a network by means of bridge tracks which connect the tracks of different modules, allowing the robotic hands to move between modules. The bridge tracks can be dynamically connected and disconnected from the modules, allowing the network configuration to change according to user needs. The individual modules are mobile and can be transported to other locations and connected with other removable-unit storage networks.

14 Claims, 11 Drawing Sheets

SCALABLE, SPACE EFFICIENT, HIGH DENSITY AUTOMATED LIBRARY

BACKGROUND OF THE INVENTION

1. Technical Field

The present invention relates to storage systems. More specifically, the present invention relates to systems for storing a plurality of components which may contain data.

2. Description of Related Art

The cost of occupying computer room floor space has become very expensive to maintain in today's cost-conscious, computer-intensive business environment. Typical automated libraries often occupy large amounts of space and yet only contain a small portion of the installation's total data (the rest being stored in warehouses). Improvements in space efficiency are required to relieve the growing need to fit more powerful computer equipment into a constrained area.

Today's large automated libraries are arranged in a way that requires a significant amount of dedicated space just to service the library. This space is, at least, as large as a normal sized adult and cannot be used for storing tapes, drives, robots, etc. The larger the library, the more space is generally required to service the functions of the equipment.

Present automated library designs do not allow space consumption scalability, which would allow users to adjust the size of the library according to their needs. Present library designs also have large individual units of configuration and do not allow much flexibility in their physical layout, reducing the efficiency with which available space can be used.

Therefore, an automated library design that is space efficient and allows scalability and flexibility in its layout would be desirable.

SUMMARY OF THE INVENTION

The present invention provides removable-unit storage modules, which can be combined into a network. The storage modules comprise storage cells arranged in a rule based structure or in an algorithmically controlled manner (e.g. series of rows and columns) which can be organized in a flat matrix configuration similar to x, y libraries today or in a curved or cylindrical matrix, and robotic hands which move along tracks in order to retrieve objects from the storage cells. In one embodiment, the storage cells are used to contain data storage units.

Several modules can be combined into a network by means of bridge tracks which connect the tracks of different modules, allowing the robotic hands to move between modules. The bridge tracks can be dynamically connected and disconnected from the modules, allowing the network configuration to change according to user needs. The individual modules are mobile and can be transported to other locations and connected with other removable-unit storage networks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

It must be noted at the outset that the methodology, technique, and means described are not limited to computer systems nor to the storage of computer data but are general in nature and apply in a broad spectrum of library and warehousing applications. The description that follows explains the use of these principles in the context of computer systems by way of illustration, and the preferred embodiment will describe their use in the context of libraries of removable storage units, whether the units be tape cartridges or complex units containing electronics.

Figure 1:
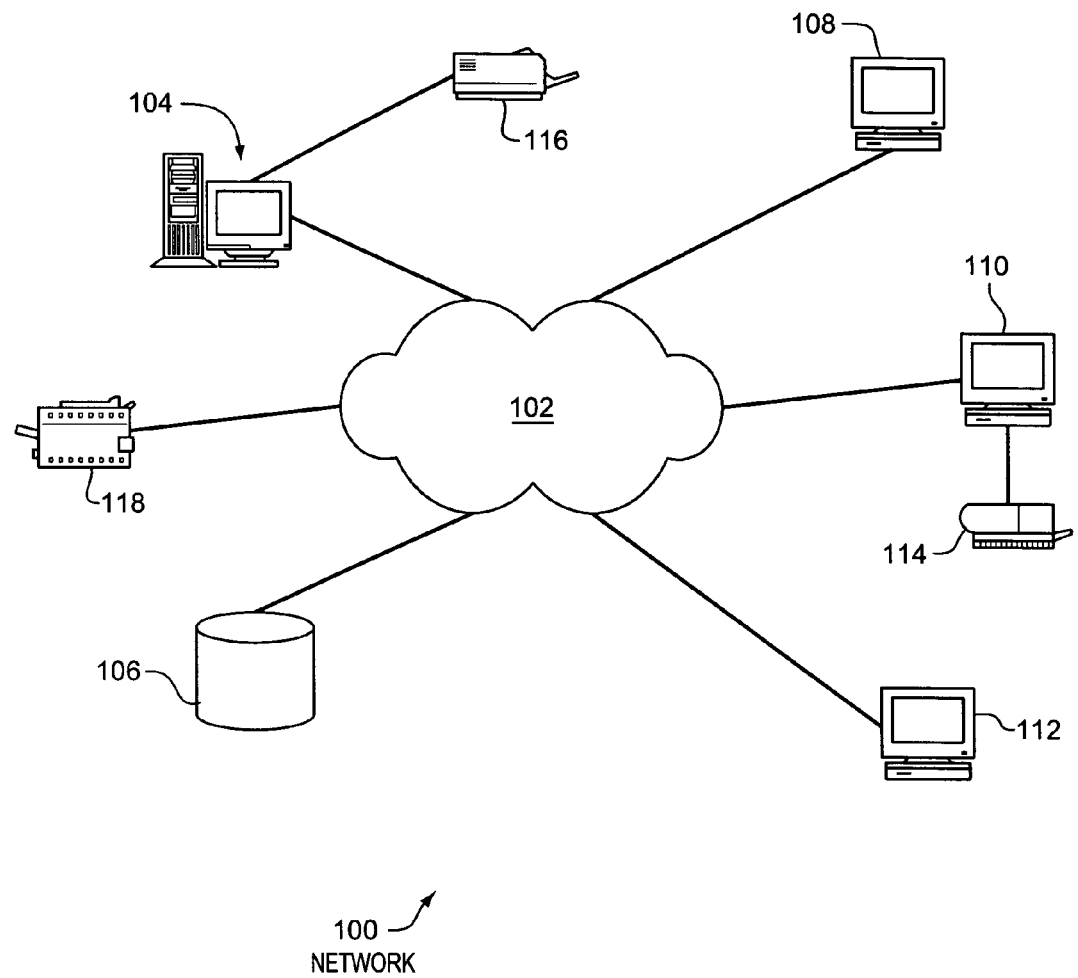
FIG. 1 depicts a pictorial representation of a distributed data processing system is in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. In the depicted example, server 104 is connected to network 102, along with storage unit 106. In addition, clients 108, 110 and 112 are also connected to network 102. These clients, 108, 110 and 112, may be, for example, personal computers or network computers.

For purposes of this application, a network computer is any computer coupled to a network that receives a program or other application from another computer coupled to the network. In the depicted example, server 104 provides data, such as boot files, operating system images, data from databases or specific files used by applications, and executable modules of applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
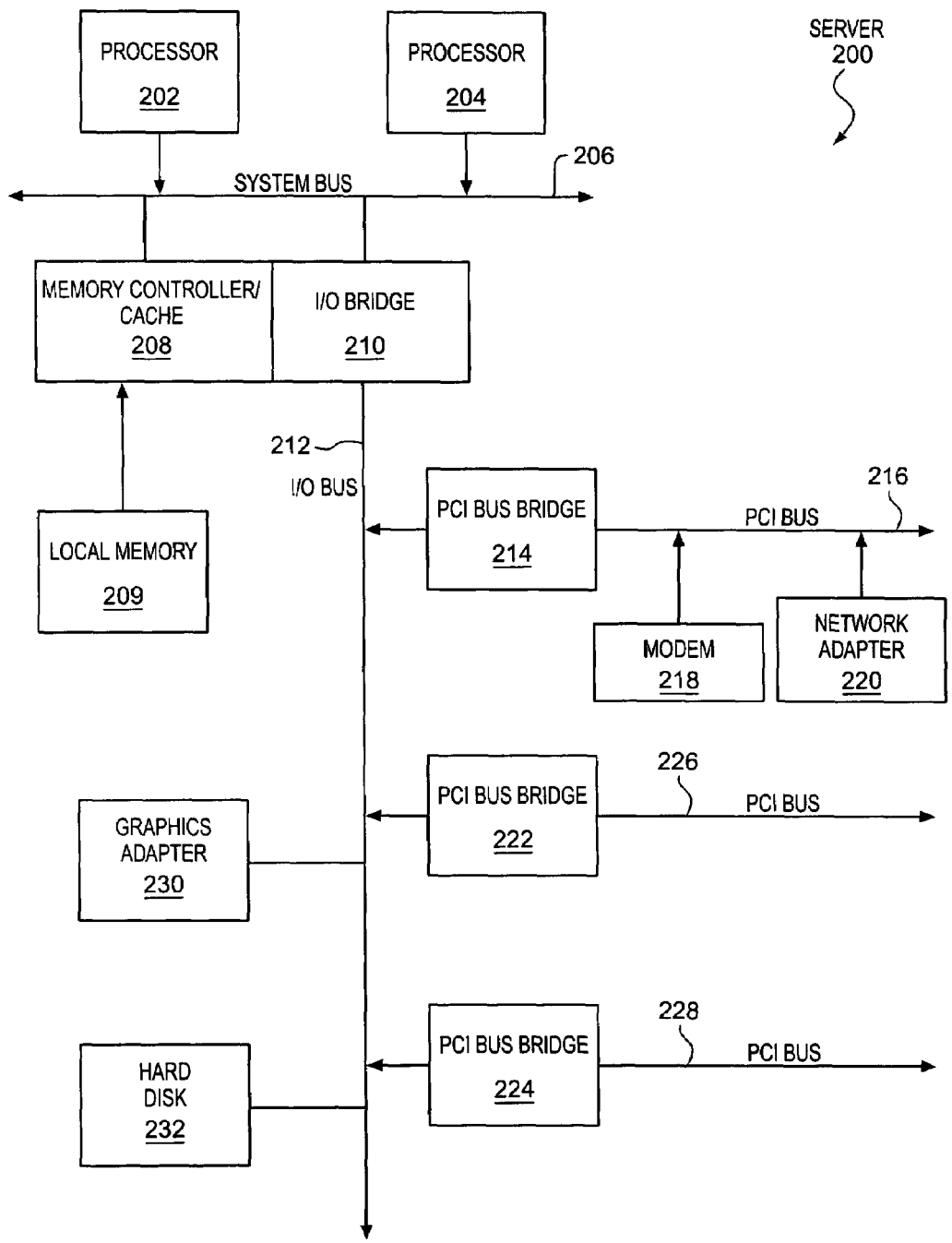
FIG. 2 depicts a block diagram of a data processing system which may be implemented as a server, in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support a specific number (often in the range of two to seven) of PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
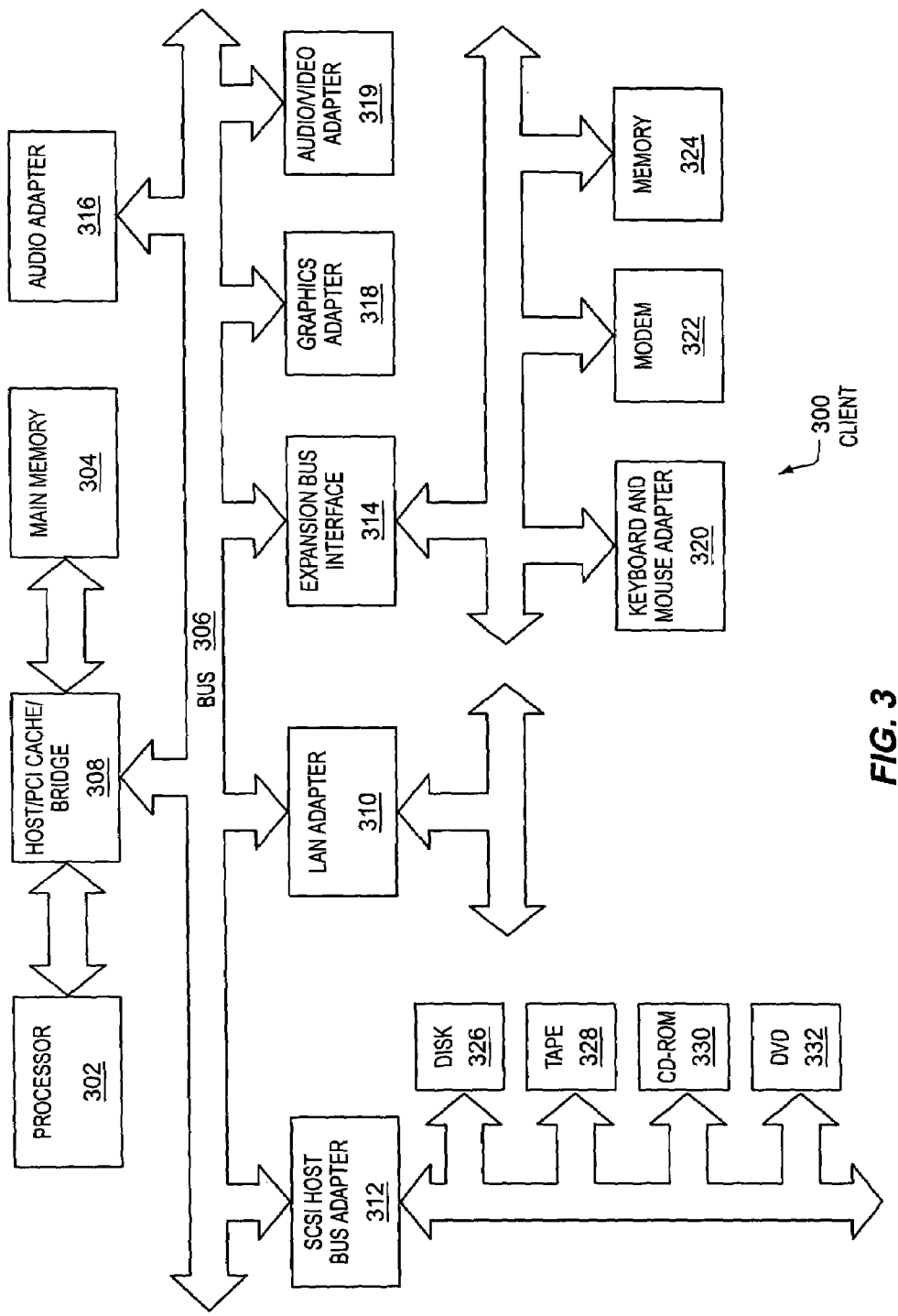
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302.

Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
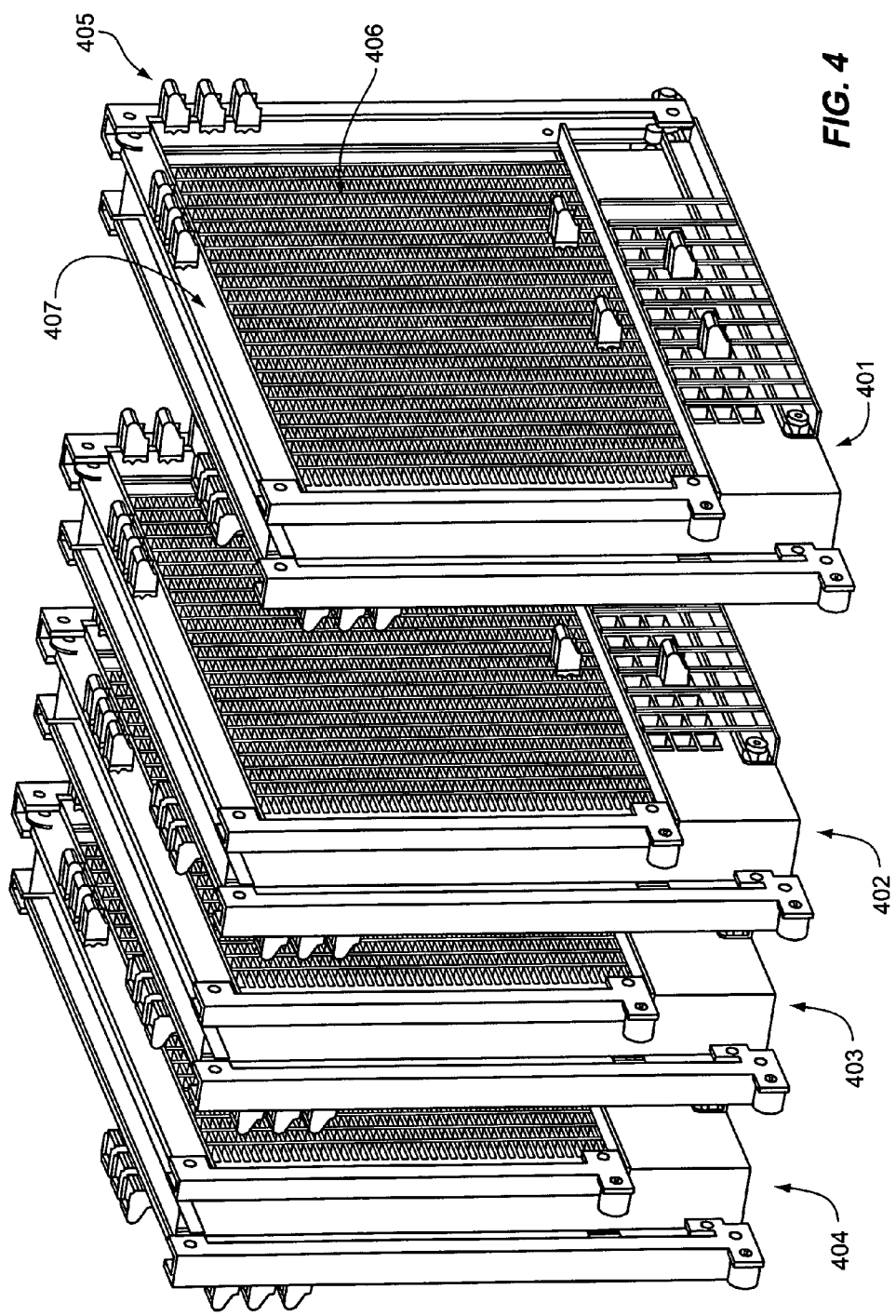
FIG. 4 depicts a perspective view pictorial diagram illustrating four modules of a removable-unit storage network in accordance with the present invention.
Figure 5:
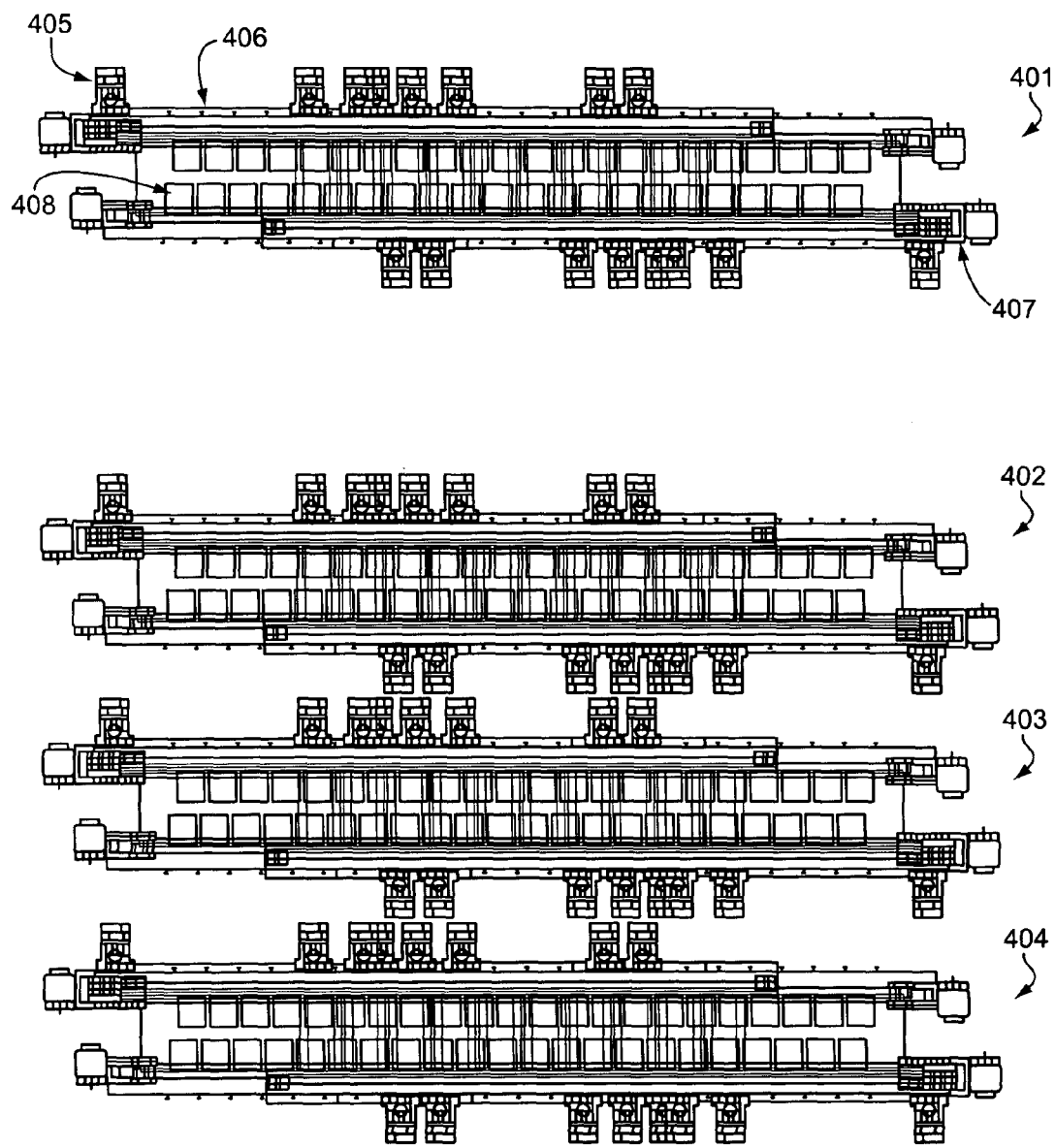
FIG. 5 depicts a top view pictorial diagram illustrating the same modules illustrated in FIG. 4.

Referring now to FIG. 4, a perspective view pictorial diagram illustrating four modules of a removable-unit storage network is depicted in accordance with the present invention. Removable units can be individual units of media such as, for example, a tape cartridge, a magazine of cartridges, or more complex units such as individual disk drives. FIG. 5 depicts a top view pictorial diagram illustrating the same modules illustrated in FIG. 4. Each module 401–404 has several robotic hands 405 which are capable of retrieving object from storage cells 408 within the modules

401–404. The robotic hands move along rows of tracks 406 and can be moved between rows of tracks by means of an elevator mechanism 407. As can be seen in FIG. 5, all of the features described can be placed on both sides of the storage modules 401–404. The modules 401–404 are identical to each other and can be used separately or in combination (as will be explained below), according to the user's needs. It is this modular feature that gives the present invention much of its flexibility and adaptability to different requirements. Note that the unused space is configured between modules 401 and 402 while the rest of the modules only have enough space to allow robotic hands to safely pass each other.

Figure 6:
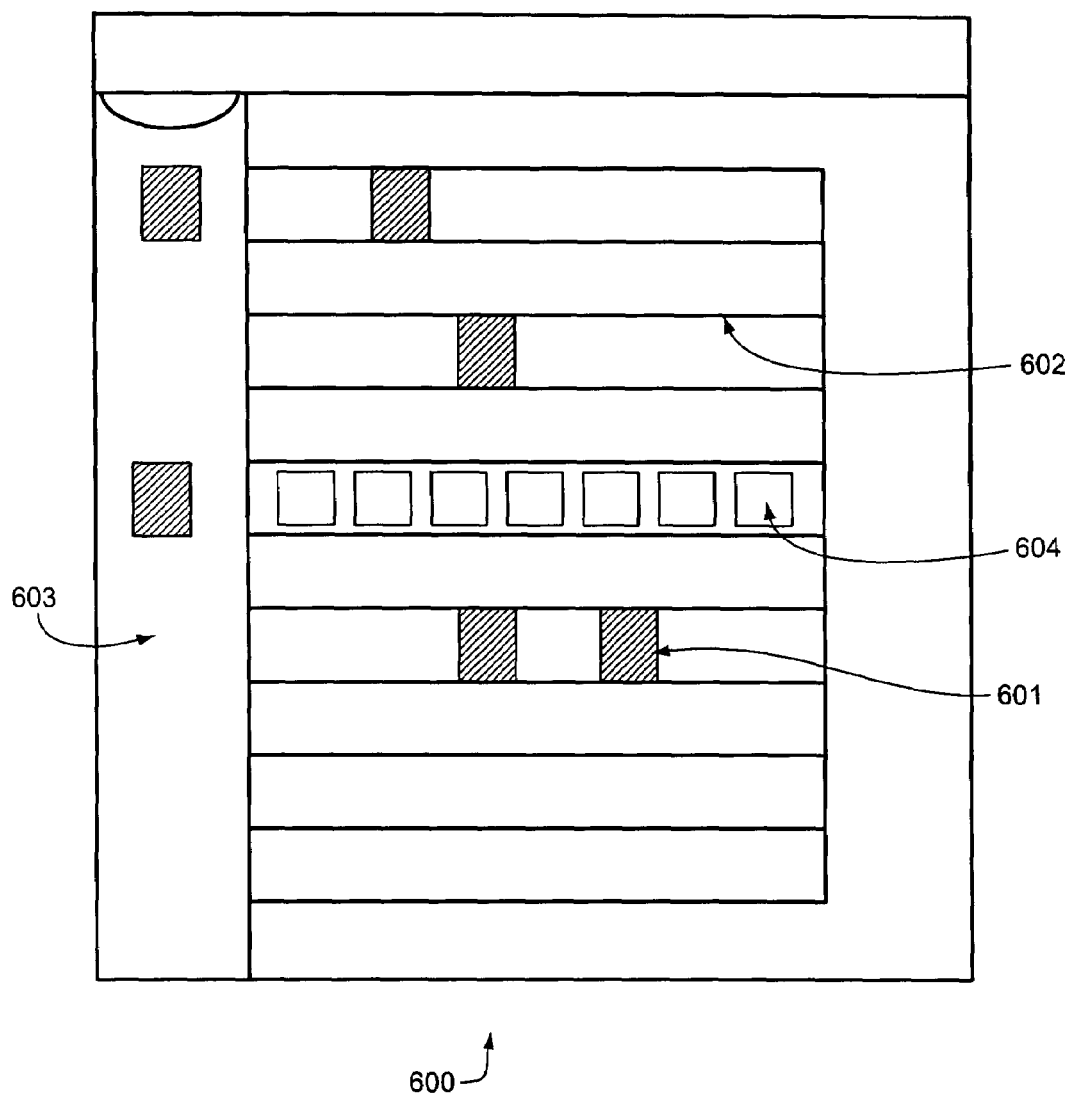
FIG. 6 depicts a schematic diagram illustrating a single module of a removable-unit storage network in accordance with the present invention.
Figure 7:
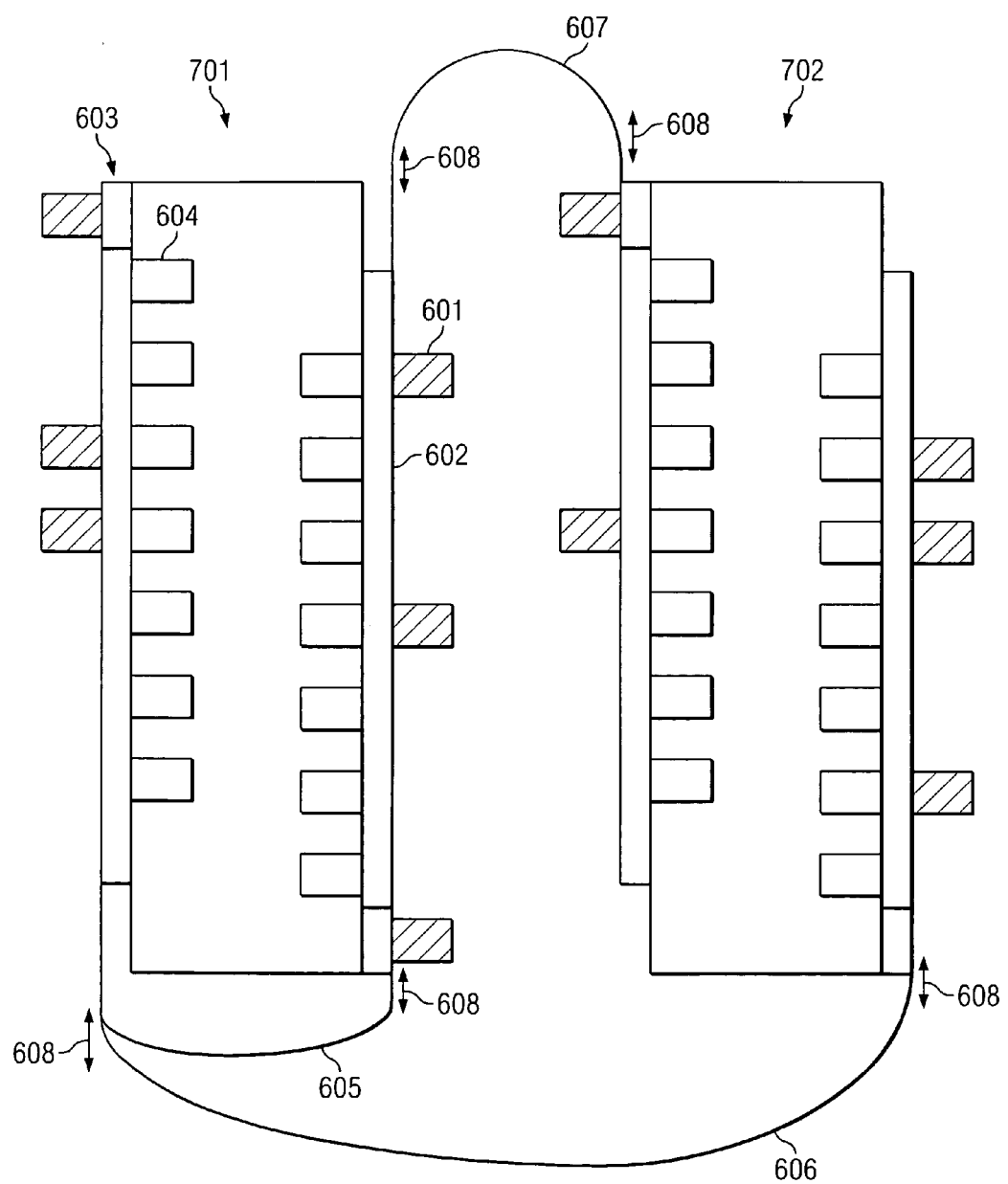
FIG. 7 depicts a schematic diagram illustrating the top view of two modules of a removable-unit storage network in accordance with the present invention.

Referring to FIG. 6, a schematic diagram illustrating a single module of a removable-unit storage network is depicted in accordance with the present invention, and FIG. 7 depicts a schematic diagram illustrating the top view of the present invention. The module 600 has several robotic hands or "bots" 601 which are capable of retrieving individual units from within module 600. The units are contained in cells, represented by cell 604 in FIGS. 6 and 7. In the present example, the cells 604 are arranged in a series or row and columns, but they could be arranged in several other geometric arrangements (e.g. spirals, ellipses) or combinations of arrangements. The general case is a rule-based structure that can be modified by moving the rails from one configuration to another. The total number of cells 604 within a module 600 can vary depending on factors such as the size of the module 600 and the size of the cells 604 themselves, depending on what kind of unit is stored.

The types of units contained with the cells 604 can include, for example, magnetic tapes, CD-ROMs, DVD-ROMs, hard drives, or any other type of data storage unit. However, it should be pointed out that the concept behind the present invention could also be applied to any type of inventory the user may wish to store in the cells 604.

In order to retrieve units from the cells 604, the bots 601 move under their own power along several rows of tracks 602. A vertical elevator mechanism 603 can be used to move bots 601 from one level of tracks 602 to another. This elevator mechanism can work by hydraulics or cables to pull bots 601 up or down and can be located at either end of the module 600 or anywhere along its length. The features of module 600 also exist on the opposite side of the module 600 (not shown) and can be used as an extension of the illustrated side, allowing the bot to circle the entire module at one track level.

Figure 8:
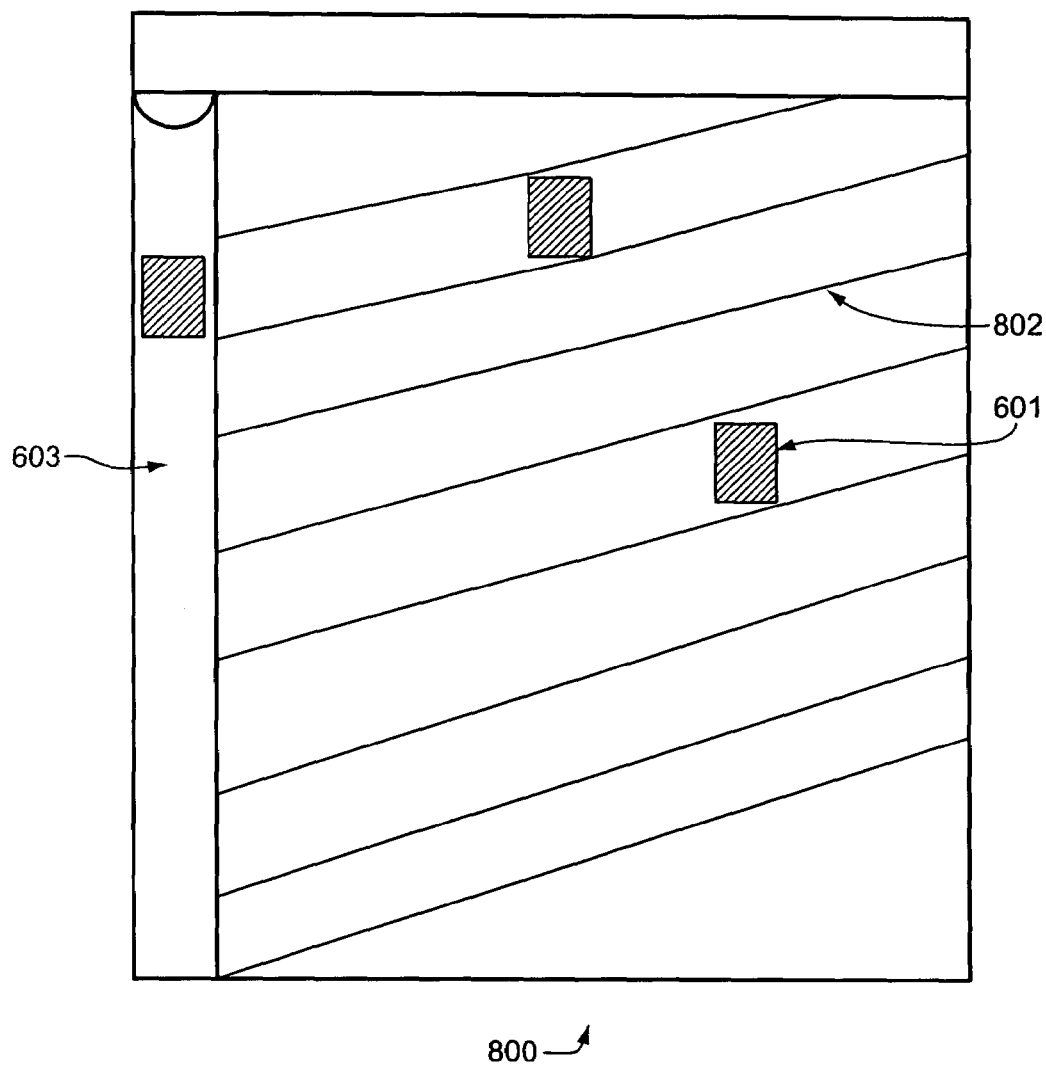
FIG. 8 depicts a schematic diagram illustrating a single storage module with canted tracks in accordance with the present invention.

An alternative embodiment of module 600, module 800 shown in FIG. 8, allows the bots 601 to spiral around the module on canted tracks 802 to the top and then use an elevator 603 to reach the bottom again. Alternatively, the embodiment in module 800 would allow the bots 601 to spiral around the module 800 to the top using a subset of the tracks 802 and then reverse direction and spiral back to the bottom using another subset of the tracks 802, then reversing direction again, repeating the process.

Figure 9:
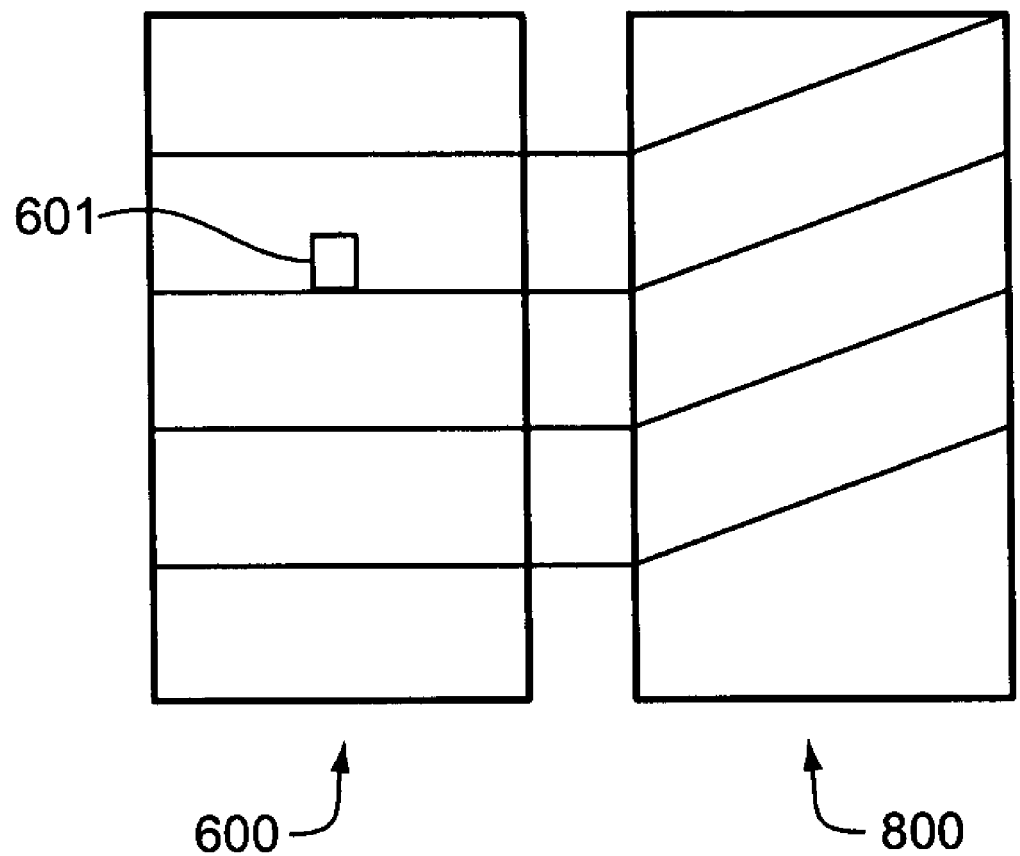
FIG. 9 depicts a schematic diagram illustrating the combination of modules with different geometric arrangements in accordance with the present invention.

Referring to FIG. 9, a schematic diagram illustrating the combination of modules with different geometric arrangements is depicted in accordance with the present invention. FIG. 9 is merely one of several possible examples of combining modules with different geometric configurations. In this example, a module with horizontal tracks, such as module 600, and one with canted tracks, such as module 800, are connected so that the bots 601 move horizontally across module 600, spiral up module 800 and then move back across module 600 at the next higher level.

To reduce interference between bots 601, the module 600 can be set up so that different rows of bots 601 move in different directions. One reason for having opposite unidirection motion on different rows is to reduce the length of motion from data storage unit location to the location of the read/write station. Unidirectional motion can also be used when modules are densely packed together, or if a spiral track design is used.

Once a bot 601 has retrieved a unit from a cell 604, it can then carry the unit to the desired location, such as a drive or a read/write station, or to a bay with I/O connections and plug it in. The drives, read/write stations, and I/O ports can be located at one or both ends of the module 600, or interspersed along its length.

The storage module 600 can also have an external skin and frame to prevent users from being snagged by moving bots 601.

The process of retrieving units and placing them in the proper places requires a mechanism to do routing and bridging of the storage housing, mating of media to drives, mating of drives to read/write stations, and determination of what components can read or write to which storage units. These functions are extant in all network systems and are known in the art.

The storage configuration used within a module 600 can be attribute or policy based. An example of an attribute based configuration is a Redundant Array of Independent Tapes (RAIT), in which a group of tapes is configured to appear as one tape to the user. For example, when the user chooses to write to tape A, the data is actually written to eight tapes and three parity tapes, so that any three tapes can be damaged or lost but the user can still retrieve all of the data.

A policy based configuration would reflect a decision made at a business level, which is then communicated to an operational level. An example of a decision at the business level would be to have something sent on payday. On the operational level, the changes to the configuration would be made as necessary to accomplish the business goal.

Many of the advantages of the present invention relate to the different ways in which several modules 600 can be networked together and separated, according to the needs of users. In addition, the networking of the modules 600 can be dynamic and change configuration as needs change during specified time periods.

Referring now to FIG. 7, a schematic diagram illustrating the top view of two modules of a removable-unit storage network is depicted in accordance with the present invention. The modules 701 and 702 in FIG. 7 are identical in structure and function to module 600 in FIG. 6. FIG. 7 illustrates several examples of how separate modules 701 and 702 can be networked together. However, the examples illustrated in FIG. 7 are by no means exhaustive, as will be explained below.

To allow the bots 601 to move from one side of a module 701 to another, convex bridges 605 can be placed at one or both ends of the module 701. The bridges 605 would connect with the horizontal tracks 602 along which the bots 601 move. The bridges 605 can be moved dynamically as needed in and out from the module 701, depending on where the bots 601 need to go. Bridges 605 on different rows can be moved independently of each other or together as a column.

To move bots 601 from one module 701 to another module 702, either a convex bridge 606 or concave bridge 607 can be used. Bridge 606 functions similarly to bridge 605 and is used to move a bot 601 between the far sides of two modules 701 and 702, as illustrated in FIG. 7. Bridge 606 could also be used if additional modules are placed between modules 701 and 702, allowing a bot 601 to move directly from one far end of a battery of modules to another. Bridge 607 is used to move a bot 601 between facing sides of different modules 701 and 702, as shown in FIG. 7. Arrows 608 schematically illustrate bridges 605–607 connecting and disconnecting from modules 701 and 702. Bridges 605–607 are connected to track 602 by any of various types of connections that are well known in the art.

The bridges 605–607 depicted in FIG. 7 are 180 degrees, allowing bots 601 to move between module sides that are parallel to each other. However, in the case where modules 701 and 702 are placed perpendicular to each other, a 90-degree connecting bridge (not shown) would be used.

Bridging can be algorithmically controlled (e.g. time based). For example, during a backup window of the day, the user may want one large network modules, but during the transaction window of the day, the user may want several smaller networks available. Bridging can also be policy controlled, establishing general goals for the network, with the details to be implemented at the algorithmic level.

Control of bridging can also serve as a security measure within a removable-medium storage network. Specific users may be given access to specific modules within the network. As a result, bridging between certain modules, and hence access to those modules, may only be accomplished from certain clients 300 within a computer network 100.

The active elements of a module (including such things as bots in motion and media in drive being read or written) can continue to be active while the module is moved from association with one set of modules in an array to association with another module. This association can be accomplished via moving bridges or via actually moving the modules.

Those skilled in the art will appreciate how the different bridge designs 605–607 can be used to various network configurations. In addition, the ability to connect and disconnect the bridges 605–607 allows the network configuration to change dynamically, according to changing needs. Not only do bridges, such as bridges 605–607, allow a given bot 601 to access units from different modules 701 and 702, but they also create new paths for bots 601 to move units from one module 701 to another 702.

An important feature necessary for bridging different modules in a removable-medium storage network is meta data. Meta data is an inventory of resources available to a module at any given time and is maintained on a micro basis (short time periods). Examples of meta data include what data storage devices are located within a module, where the storage units are located, and how many bots are now on the module and where they are located, which can change every few fractions of a second as bots move from one module to another. When bridging it is very important to connect a bridge and then merge and integrate the meta data from the two or more modules connected. When a bridge is removed, the meta data is uncoupled. Meta data can be stored in NV-RAM, on a hard drive, or any other type of non-volatile memory storage within the modules, which can hold its memory without power.

An additional feature of the present invention, which gives it even greater versatility, is the ability to physically move a module from one location to another. Current library structures have rigid placement of storage modules, which include unused space (e.g. necessary for maintenance and repair operations by a human operator). The present invention allows for this previously empty space to be filled with storage modules and for needed empty space to be realized when requested, by moving a module(s). The previous discussion on bridges requires that the bridges be adaptable to the range of motion of the modules by, for example, extenders or by flexing.

Figure 10A:
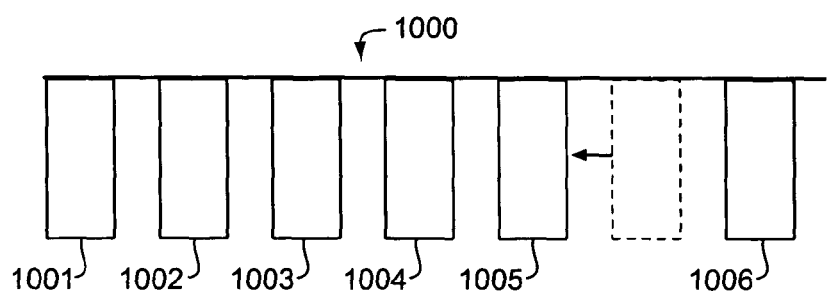
FIGS. 10A–C depict schematic diagrams illustrating movable module arrays in accordance with the present invention.
Figure 10B:
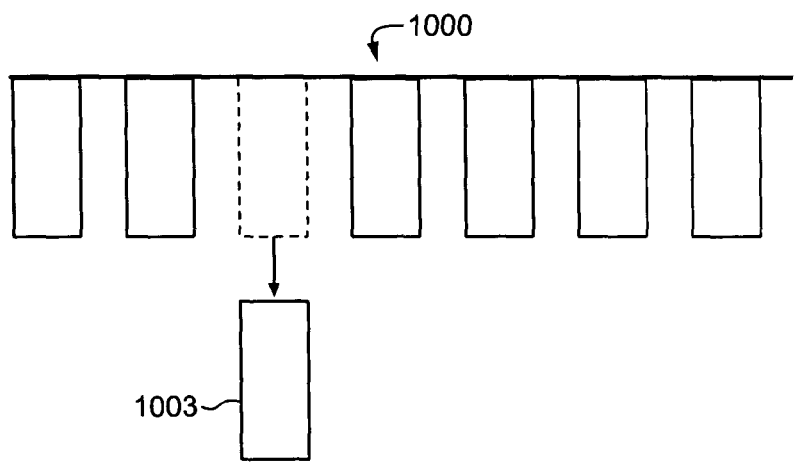
Figure 10C:
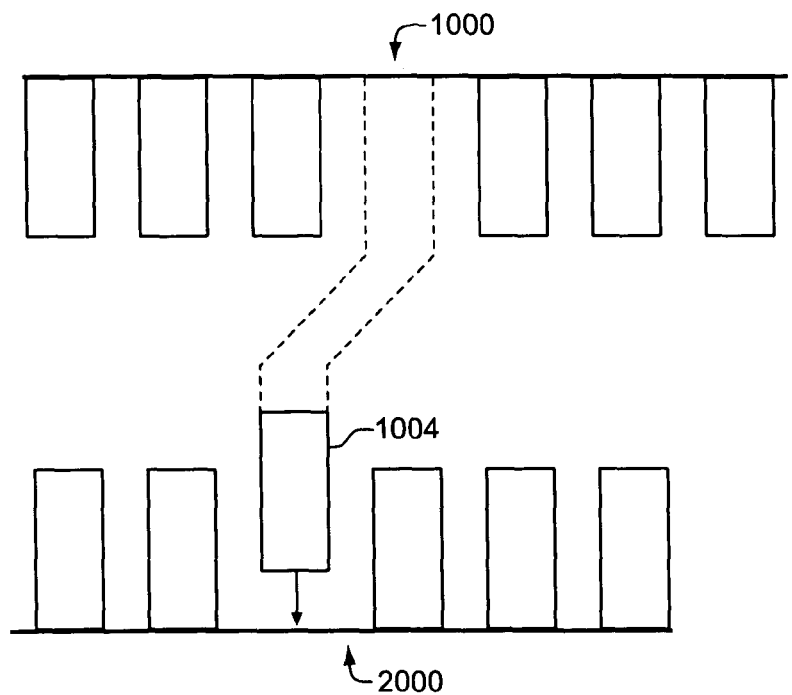

Referring to FIGS. 10A–C, schematic diagrams illustrating movable module arrays are depicted in accordance with the present invention. The ranges of motion for the modules include some that keep the modules in service and part of the overall processing of the array 1000 of modules while being moved, as illustrated in FIG. 10A. In FIG. 10A, the end modules 1001 and 1006 are fixed, and the middle modules 1002–1005 are movable. Space for human intervention (e.g. repair) can be realized between any pair of modules by laterally moving one of the middle modules 1002–1005. In FIG. 10A, module 1005 is moved laterally. In another embodiment, some movement of a module would allow the module to remain in service but require that it be disconnected from the rest of the array 1000, as shown in FIG. 10B. In FIG. 10B, the module 1003 is moved perpendicular (horizontally or vertically) to the array 1000 in order to create space for human intervention. Yet another embodiment, part of the range of motion would allow a module 1004 to be removed from one array 1000 into another 2000, as illustrated in FIG. 10C.

Figure 11:
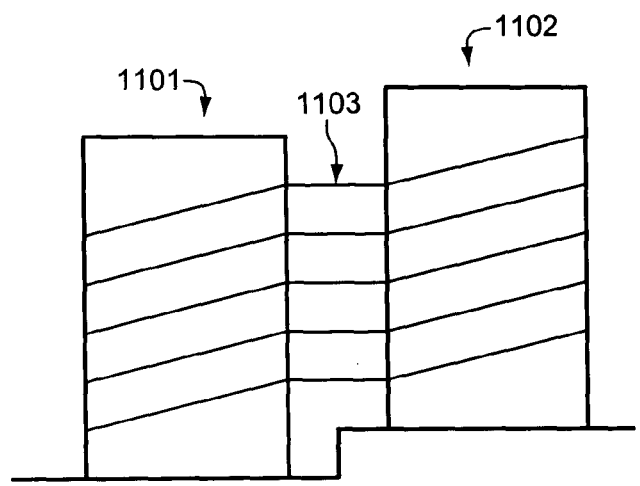
FIG. 11 depicts a schematic diagram illustrating how the present invention can be applied to modules with different elevations.

FIG. 11 depicts a schematic diagram illustrating how the present invention can be applied to modules with different elevations. Bot tracks 1103 are used as connecting bridges to connect modules 1101 and 1102, which are at uneven elevations.

Figure 12:
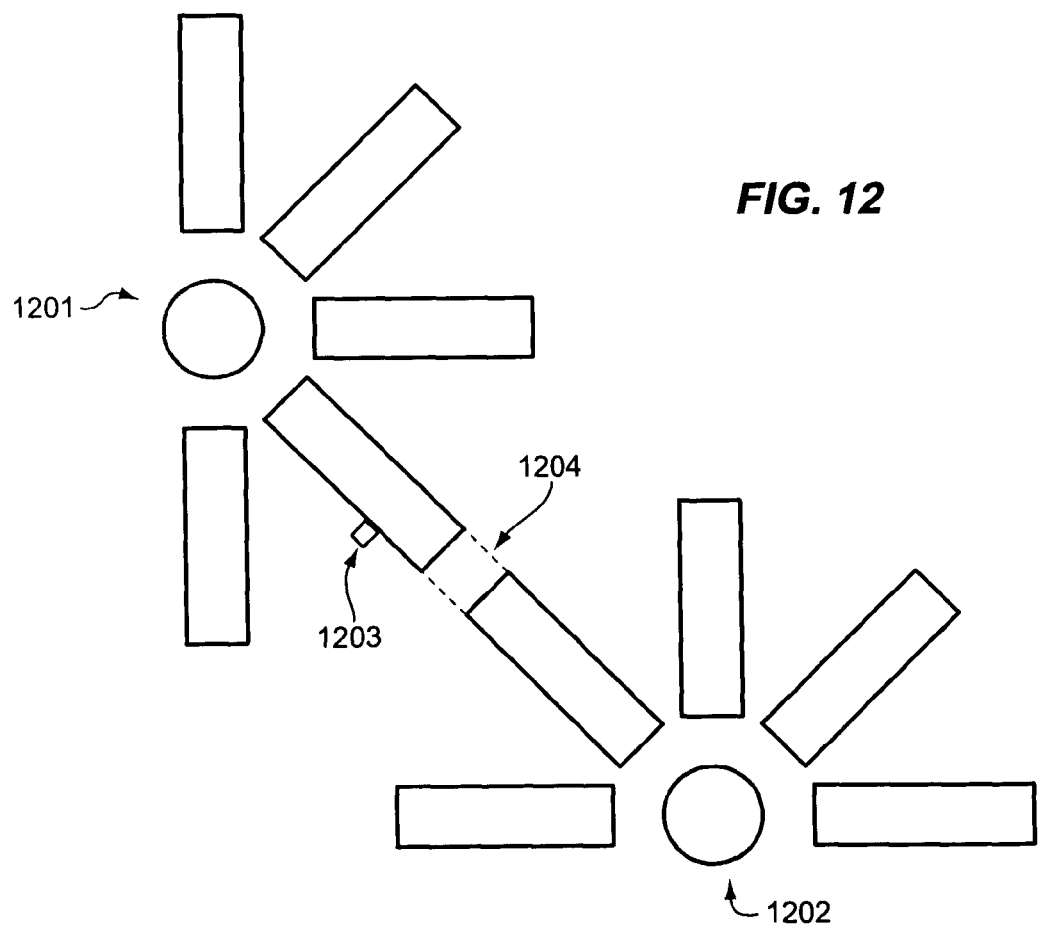
FIG. 12 depicts a schematic diagram illustrating how the present invention can be combined with more traditional rotating robotic retrieval systems.

FIG. 12 depicts a schematic diagram illustrating how the present invention can be combined with more traditional rotating robotic retrieval systems. Separate rotational libraries 1201 and 1202 can be connected together by bridge tracks 1204, allowing bots 1203 to move between libraries 1201 and 1202. In this manner, the ends of modules can function as cartridge access ports.

If a module has self-locomotion, it could be driven like a radio-controlled car in two different ways. The first method is arrhythmic, in which an onboard or remote system knows the floor layout and directs the module to the correct location. The second option is for a person to manually control the module with a remote control. Stability concerns when driving a module are easily solved by means of ballast in the bottom, a wider base, or transporting the module on a cart with a wide base. In addition to self-locomotion, modules can be loaded into a transport, shipped to anywhere in the world, and then networked with a new set of modules in the new location. When transporting modules between different locations, the ability to integrate and decouple meta data between modules is critical.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A removable-unit storage module, comprising:
    a housing;
    storage cells arranged within the housing, wherein the storage cells contain a plurality of objects;
    robotic hands to retrieve the plurality of objects from the storage cells; and
    module tracks, wherein the module tracks are substantially parallel rows of configurable instances of tracks attached to the housing on which the robotic hands travel, wherein the module tracks spiral around the storage module from bottom to top.

2. A removable-unit storage module, comprising:
    a housing;
    storage cells arranged within the housing, wherein the storage cells contain a plurality of objects;
    robotic hands to retrieve the plurality of objects from the storage cells;
    module tracks, wherein the module tracks are substantially parallel rows of configurable instances of tracks attached to the housing on which the robotic hands travel; and
    bridge tracks to connect the rows of module tacks on opposite sides of the storage module, and to connect rows of module tracks on one storage module to rows of module tracks on another storage module.

3. The removable-unit storage module according to claim 2, wherein the bridge tracks can be connected to and disconnected from the storage module dynamically.

4. The removable-unit storage module according to claim 3, wherein the bridge tracks can be connected and disconnected from the storage module independently of each other.

5. The removable-unit storage module according to claim 3, wherein the bridge tracks can be connected and disconnected from the storage module together as a column.

6. A removable-unit storage module, comprising:
    a housing;
    storage cells arranged within the housing, wherein the storage cells contain a plurality of objects;
    robotic hands to retrieve the plurality of objects from the storage cells;
    module tracks, wherein the module tracks are substantially parallel rows of configurable instances of tracks attached to the housing on which the robotic hands travel; and
    bridge tracks to connect the rows of module tracks on opposite sides of the storage module, and to connect the rows of module tracks on one storage module to the rows of module tracks on another storage module;
    wherein the bridge tracks can be connected to and disconnected from the storage module dynamically;
    wherein the bridge tracks can be adapted to a variable distance between storage modules.

7. The removable-unit storage module according to claim 6, wherein a multiplicity of such storage modules are configured to work as an organized array.

8. The removable-unit storage module according to claim 6, wherein storage cells, robotic bands and module tracks are on both sides of the storage module.

9. The removable-unit storage module according to claim 6, further comprising an elevator mechanism for moving robotic hands from one row of module tracks to another.

10. The removable-unit storage module according to claim 6, wherein the robotic hands move in one direction for each row of module tracks.

11. The removable-unit storage module according to claim 6, wherein the storage cells hold data storage devices.

12. The removable-unit storage module according to claim 6, wherein the storage cells hold inventory items.

13. The removable-unit storage module according to claim 6, wherein the storage cells are arranged in a rule based structure within the housing.

14. A removable-unit storage module, comprising:
    a housing;
    storage cells arranged within the housing, wherein the storage cells contain a plurality of objects;
    robotic hands to retrieve the plurality of objects from the storage cells;
    module tracks, wherein the module tracks are substantially parallel rows of configurable instances of tracks attached to the housing on which the robotic hands travel; and
    bridge tracks to connect the rows of module tracks on opposite sides of the storage module, and to connect the rows of module tracks on one storage module to the rows of module tracks on another storage module;
    wherein the bridge tracks can be connected to and disconnected from the storage module dynamically;
    wherein the bridge tracks can be adapted dynamically to the distance between storage modules while at least one of the storage modules is in motion.

* * * * *